UNITED STATES PATENT OFFICE.

JOSEPH HAY AMIES, OF PHILADELPHIA, PENNSYLVANIA, ASSIGNOR TO THE AMIES ASPHALT COMPANY, OF PHILADELPHIA, PENNSYLVANIA, A CORPORATION OF SOUTH DAKOTA.

METHOD OF MANUFACTURING A MASTIC FOR PAVING.

No. 929,813.        Specification of Letters Patent.        Patented Aug. 3, 1909.

Application filed December 26, 1908. Serial No. 469,463.

*To all whom it may concern:*

Be it known that I, JOSEPH HAY AMIES, a citizen of the United States, residing at Philadelphia, in the county of Philadelphia and State of Pennsylvania, have invented a certain new and useful Method of Manufacturing a Mastic for Paving, of which the following is a specification.

This invention relates to the method of manufacturing a mastic used in construction of roads, streets, side-walks, floors and the like, and generally stated consists in preparing a mastic composed of mineral matters, artificial or natural asphalts, or resinous or carbonaceous elements, caustic lime, or other alkali, volatile oils, water dampened sand, or the like, the said mastic being maintained in a granular and friable condition until used.

The principal object of the present invention is to secure a mastic capable of being laid in a cold state and that is practically insensible to temperature or climatic changes.

A further object of the present invention is to provide a mastic of a friable nature having a permanent active adhesive tendency after pressure has been applied thereto.

A further object is to dispense with artificial heat in the preparing of the mineral matter.

Other objects of the invention will appear hereinafter.

In practicing my invention, I place upon a mixing board or in a mixing machine the desired quantity of mineral matters in a cold condition. Or I may place a heated cement in a hot mixing pan or machine and add the other elements therein. These mineral matters may be broken stone, slag, pebbles, gravel, sand or ashes, or the-like. Fibers may be used also. These mineral matters are then mixed with a desired amount of volatile elements consisting of crude naphtha or crude gasolene or other volatile oil, or alcohol, or the like. This volatile oil may contain creosote, asphaltic oil or the like. If the mineral matters are wet, as is usually the case, the volatile oil will adhere to the moisture covered mineral matter and prepare the same to accept the asphalt or bituminous cement, or the like, which is now mixed in the mass. It would be impossible to coat cold mineral matter with the hot asphaltic or other viscid cements when the said cements are fluxed to a desired degree without the use of the said volatile oil. The bituminous or other cements should be hot enough to readily flow. The mineral particles covered with the oil are now thoroughly mixed with the said cement, after which a proper amount of caustic lime, (either hydrate or quick lime), in a granulated or powdered condition is mixed with the mass. The above mentioned caustic lime may be omitted, but for reasons to follow its use is preferable. When the caustic lime has been thoroughly mixed with the above described elements, a proper amount of sand, stone dust or the like, having been previously well dampened with water is mixed therewith. The damp sand will form around the particles going to make up the mastic, with the result that it will serve to prevent the particles from adhering, thereby securing a mastic of a granular and pliable nature. Were it not for the use of the dampened sand, the mastic would form into lumps or batches during the cooling of the cement. As the said friability of the mastic is attained by the dampness of the sand it stands to reason that any other substance carrying the moisture may be used instead of sand, and water sprinkled in upon the mass may secure the same results; but we have found it convenient to use dampened sand. The mastic may be now placed in storage or used immediately.

In practice I have tried to mix the mineral matter with the hot cement by placing the hot cement into hot kettles or mixing pans or mixing machines, then mixing into the cement the alkali then putting therein the mineral matters hot or cold; and I have tried this method by first placing the mineral matters hot or cold into the hot cement in a hot pan then placing therein the calcium oxid or calcium hydrate, but found the former method preferable and much quicker and cheaper. Hot mineral matters and hot cement thus treated will not take the volatile oils, and these are essential to the quality of work I desire.

Assuming that the mastic is to be laid upon a street or road, it may be applied to an existing surface or to a prepared foundation. In either event it is laid in a cold state, raked to place and rolled or tamped. In the rolling process the friable or granular particles are squeezed together and adhere forming a solid mass, thus becoming a pavement without voids. Further, the paving will pack and toughen under rolling and heavy traffic and eventually reach a constituency similar to semi-hard rubber.

It may be remarked that in the customary process asphaltic or bituminous elements and mineral matters are mixed together in a highly heated state and the resulting mastic must be placed upon a road or street and rolled or otherwise compressed at the cooling points, otherwise the mastic becomes a hard, solid body impossible to handle. After such a process the elements become hard and crystallized in temperatures under 60° F. and subject to surface granulation and abrasion in consequence thereof; whereas, by my process, I secure a mastic of a granular and friable condition, which can be conveniently handled in any temperature, and the results secured are owing, in a measure, to the large percentage of fluxing elements I am enabled to use. These fluxing elements amount to about 40% in weight of the asphaltic cement, whereas, in the customary processes not nearly so high a percentage of the fluxing elements can be used. I am enabled to use a large percentage of fluxing elements because the caustic lime takes up, converts and holds the volatile elements of the fluxing oils, causing the asphaltic cement to toughen and to become indifferent to changes of temperature, and thereby eliminating aging or oxidation. In practice I have found that caustic lime is best adapted for my process, and it may be either hydrate of lime, that is, calcium hydrate, or quick lime, that is, calcium oxid. It would not answer the purpose of this invention to boil the caustic lime with asphalt or bituminous elements, because of the impossibility of it thereafter being united and evenly distributed among the mineral elements. I also secure saponification of certain elements in the asphaltic, bituminous or resinous substances and the like, by the use of an alkali, preferably lime, as above mentioned, thereby making the mastic indifferent to changes in solar temperatures, and practically eliminating aging or oxidation as before mentioned. I do not confine myself to the alkali of caustic lime to produce the saponification of the said elements but find this preferable on the account of cheapness and effectiveness.

What I claim is:

1. The process of making a bituminous mastic which consists in taking mineral matter, earthy matter or fibrous matter, and treating same with a volatile oil, to facilitate the adhering of a bituminous cement around said particles, applying an alkali, as caustic lime, to produce saponification and arrest the evaporation of the volatile elements and fix the same, and adding dampened sand, water, and the like, to said coated particles to form a mastic of a granular and friable nature.

2. The process of making a bituminous mastic, which consists in taking mineral matter, coating said mineral matter with a suitable oil, then mixing therewith an asphaltic, bituminous, resinous carbonaceous and like cement, to cover the mineral particles, then mixing therewith caustic lime, and finally coating the bituminous particles with dampened sand to produce a mastic of a granular and friable nature.

3. The herein described method of building a road and the like, which consists in taking a bituminous mastic composed of calcium oxid or calcium hydrate in dry powdery form, the mastic being of a granular and friable nature, spreading and rolling the same in a cold state, and compressing the particles together to a finished surface.

4. The hereindescribed process which consists in mixing an alkali as calcium oxid or calcium hydrate in dry powdery form with mineral, earthy or fibrous matter, then adding thereto asphaltic or other bituminous, resinous, carbonaceous and like elements, to provide a bituminous composition.

5. The method of placing heated bituminous cement in a heated pan, then mixing heated mineral matters therewith, then adding calcium oxid or calcium hydrate, then coating same with dampened sand, as set forth.

6. The method of placing mineral matters in a heated pan, then mixing the said mineral matters with hot asphaltic or other bituminous cement, or the like, then adding calcium oxid or calcium hydrate and, then coating same with dampened sand and the like, as fully set forth.

JOSEPH HAY AMIES.

Witnesses:
WILLIAM J. JACKSON,
P. S. DUNN.